United States Patent [19]
Kitch

[11] 3,734,617
[45] May 22, 1973

[54] FILM DEPLETION DETECTION SYSTEM

[75] Inventor: Paul E. Kitch, West Springfield, Mass.

[73] Assignee: Scott Paper Company, Philadelphia, Pa.

[22] Filed: Apr. 26, 1971

[21] Appl. No.: 137,413

[52] U.S. Cl. ................355/111, 226/11, 352/155
[51] Int. Cl. .............................................G03b 27/10
[58] Field of Search..........................355/111, 108; 352/155; 226/11

[56] References Cited
UNITED STATES PATENTS

| | | | |
|---|---|---|---|
| 3,237,516 | 3/1966 | Shearer et al. | 35/62 X |
| 2,481,694 | 9/1949 | Schubert et al. | 355/48 |
| 2,841,065 | 7/1958 | Gage et al. | 355/111 X |
| 2,471,786 | 5/1949 | Shepler | 352/155 |
| 2,676,513 | 4/1954 | Enstrom | 226/11 |
| 3,409,196 | 11/1968 | Brown et al. | 226/11 |
| 3,605,618 | 9/1971 | Clasen | 226/11 X |
| 3,071,332 | 1/1963 | Dain et al. | 226/11 X |
| 2,744,491 | 5/1956 | Vergobert | 226/11 X |

Primary Examiner—Richard L. Moses
Attorney—William J. Foley, Martin L. Faigus, John W. Kane and John A. Weygandt

[57] ABSTRACT

A machine for handling films or tapes, such as film duplication apparatus, in which the image on an original master film is reproduced on a duplicating film by contact printing techniques, wherein the individual films or tapes are brought into overlying relationship with one another, jointly transported through an operational station, such as an illumination station in the case of film duplication, and separated. The apparatus includes a mechanism for moving each of the individual films or tapes through the operational stations, which mechanism is driven by an electric motor. Switches are employed to detect the depletion of one of the films or tapes, and to stop the electric motor driving the transport mechanism so that, in the case of film duplication apparatus, the master film will not be advanced further until fresh duplicating film is fed into the apparatus, or duplicating film will not be fed into the apparatus until a new master film has been threaded into the apparatus, depending upon which of the films became depleted. The apparatus also uses the switches both to turn off or to reduce the intensity of the light source directing light at the illumination station of the film duplicating apparatus, and to change the direction on the shutter drive motor so as to close the shutter, when one of the films is depleted.

9 Claims, 2 Drawing Figures

INVENTOR.
PAUL E. KITCH

INVENTOR.
PAUL E. KITCH

FILM DEPLETION DETECTION SYSTEM

BACKGROUND OF THE INVENTION

1. Field of the Invention

This invention relates to improvements in apparatus for handling films or tapes, such as film duplication apparatus, and particularly, to a system for detecting the depletion of one of a plurality of individual films or tapes being advanced or transported through such apparatus in order to accomplish certain functions within the apparatus.

2. Brief Description of the Prior Art

In the past, in apparatus where a plurality of films or tapes were jointly transported through an operational station for treatment in some manner, the operator out of necessity has had to closely monitor the operation in order to stop the apparatus when one of the films or tapes was depleted in order to permit a new film or tape to be fed into the apparatus and to prevent waste product from being formed due to the absence of the missing film or tape. This situation has been extremely costly when the tapes or films were formed of relatively expensive materials, such as photosensitive film materials and the like commonly fed through film duplication equipment. Not only was there a waste of duplicating film, as where the original master film became depleted so that the duplicating film then became fully exposed and was ruined, but also considerable time and expense was involved to somehow rearrange the apparatus and the master film therein so that the duplication process could recommence at the point where the duplicating film became depleted and duplication stopped. Similarly, when the duplicating film became depleted, the master film would merely be running through the equipment without any useful function being performed, and would have to be rewound to recommence the film duplication at the right point on the master film strip, all of which was costly and time consuming.

In other apparatus where a plurality of tapes were processed through an operational station for treatment or to control a function, if one tape became depleted, serious damage could result. For example, where information on several cooperating tapes is read for controlling automatic tools and the like, it would be essential to note the depletion or breakage of one of the tapes and to shut off the apparatus until a new tape could be inserted or the broken tape could be repaired. Although the terms "film" and "tape" will be used interchangeably throughout the specification and the claims, such terms are intended to encompass any sheet or strand material in long, continuous, or endless form.

In view of the above-described difficulties and shortcomings of the prior art, a system has been discovered for detecting the depletion of one of a plurality of tapes being jointly transported through such apparatus which would overcome the above-mentioned problems and which would automatically stop the further advance of the tapes or films through the apparatus. In a particular embodiment of the present invention, in which the tapes are films, and the apparatus handling them comprises film duplication apparatus in which an imaged master film overlies a duplicating film, and light is transmitted through the master film onto the duplicating film, it has been found possible and advantageous to also control the position of the shutter and the intensity of the light source when one of the films is depleted. For example, if the master film becomes depleted it is advantageous for the shutter to be closed to facilitate removal of the duplicating film or the addition of new master film without undue exposure of the duplicating film. It is also advantageous to reduce the intensity of the light source in the event either film becomes depleted and the film drive motor stops, as this increases the operating life of the light source which is an expensive element of such apparatus.

Accordingly, it is a principal objective of the present invention to stop the operation of apparatus for handling a plurality of tapes and films in a cooperative operation when one of the tapes or films is depleted.

It is an additional object and advantage of the present invention to automatically stop the transport of films through film duplication apparatus when one of the films is depleted.

It is a still further object and advantage of the present invention to eliminate the damage to duplicating film from exposure to light when the master film being duplicated is depleted.

SUMMARY OF THE INVENTION

The invention is an improvement in a machine for handling tapes, wherein a plurality of individual tapes are brought into overlying relationship with one another, jointly transported through an operational station, and separated. The machine includes tape transport means for moving each of the plurality of individual tapes through the operational station, and an electrically controlled drive means operably connected to the tape transport means. The improvement comprises actuating means for detecting the depletion of one of the tapes, the actuating means being operably connected to the drive means so as to stop the drive means when the depletion of the tape is detected.

In a preferred embodiment, the invention is an improvement in apparatus for duplicating film, and the actuating means are operably connected to the light source used for illuminating the films for duplication purposes at the illumination station. In this arrangement, the light source is reduced in intensity when one of the films is depleted. This embodiment of the apparatus also includes an electrically controlled shutter operably disposed between a light source and the illumination station, and the actuating means are operably connected to the shutter so as to close it when one of the films is depleted.

DESCRIPTION OF THE DRAWINGS

Additional objects and advantages of the present invention will become apparent from the following detailed description thereof, taken on conjunction with the following drawings, in which.

DETAILED DESCRIPTION OF THE PREFERRED EMBODIMENTS

Figure 1:
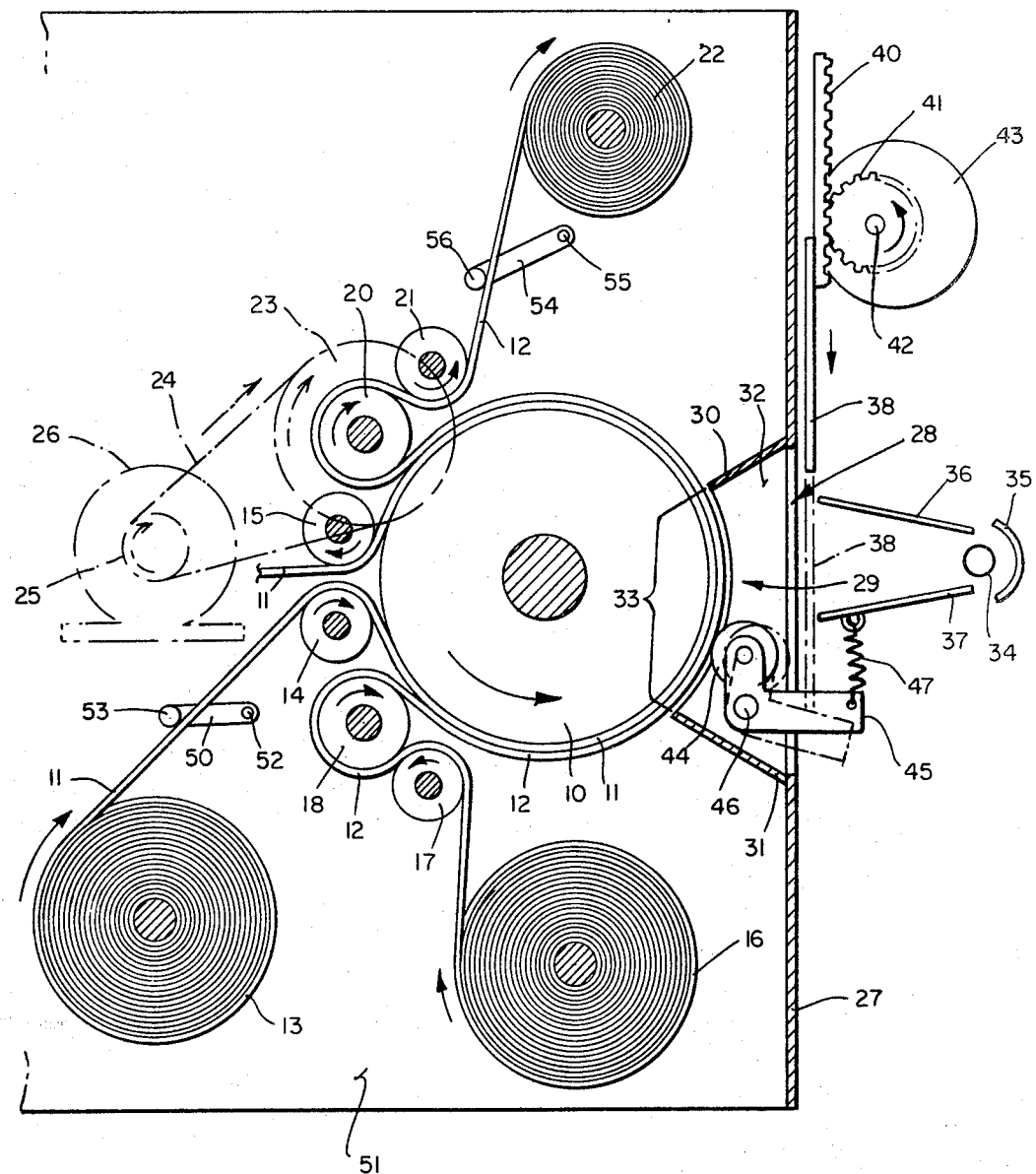
FIG. 1 is a sectional elevation view of one form of film duplication apparatus in which the film depletion detection system of the present invention is employed, and shows the positions of switches which form a part of the detection system of the present invention.

Referring now to the drawings, FIG. 1 shows a portion of one form of film duplicating apparatus in which the present invention is utilized. The film duplicating apparatus includes a rotatably mounted support cylinder 10 on the surface of which an unimaged photosensitive duplicating film 11 is supported. An original master film 12, that is, a light-stable, previously exposed film which already contains a developed visible image, is superimposed upon the duplicating film 11. The films 11 and 12 are supported in this manner and run in contact with one another and the surface of the support cylinder 10 through about 270° of rotation of the support cylinder 10. The duplicating film 11 is fed onto the support cylinder 10 from a film reel 13 and after it passes around a guide roller 14. Upon leaving the support cylinder 10, the duplicating film 11 passes around a guide roller 15 and advances toward a developing chamber (not shown) where it is developed in accordance with well-known techniques, the nature of which depends upon the type of film system employed.

The duplicating film 11 is of a nature such that it is photosensitive so that when it is exposed to a light-shadow image, as by transmission of light through the master film onto the duplicating film, a developable image will be created on the duplicating film. The duplicating film 11, for example, may be of a conventional silver halide form or of a conventional diazo form, the nature of each being well-known to those skilled in photography and copying.

The master film 12 is fed from a film reel 16 around a snubbing roller 17, and then around a guide roller 18, after which it is fed around the periphery of the support cylinder 10 on top of the duplicating film 11. Upon leaving the support cylinder 10 and the duplicating film 11, the master film 12 is fed around a guide roller 20 and then around a snubbing roller 21 and onto a take-up reel 22. The guide roller 20 has a pulley 23 which is connected by a belt 24 to a pulley 25 driven by a motor 26. The entire film system is driven by the motor 26 operating through the guide roller 20. Therefore, it is frictional force between the master film 12 and the outer periphery of the guide roller 20 which advances the duplicating film 11 and the master film 12 around the support cylinder 10 and through an exposure station described subsequently. Of course, suitable provision is made to drive the take-up reel 22 for the master film 12 and the take-up reel (not shown) for the duplicating film 11. For example, they may be driven by the motor 26 in a manner similar to guide roller 20 and at the same speed.

The side wall 27 of the duplicating apparatus has an opening 28 therein radially disposed from the support cylinder 10. A light chamber 29 is formed by spaced-apart upper and lower inclined walls 30 and 31, respectively, radially extending from the side wall 27 at the top and bottom of the opening 28 to a point closely spaced from the surface of the support cylinder 10 and side walls 32, only one of which is shown, which connect the respective ends of upper and lower walls 30 and 31 to generally define an exposure station, indicated generally by the bracket 33. Thus, exposure of the duplicating film 11 to light projected through the master film 12 only occurs when the films 11 and 12 pass over the support cylinder 10 between the lower side wall 31 and the upper side wall 30.

A lamp 34 is spaced from the side wall 27 in line with the opening 28 therein. The lamp 34 is partially enclosed by an arcuate reflecting element 35 and outwardly diverging upper and lower reflecting elements 36 and 37, respectively, spaced apart from one another. All of the reflecting elements 35, 36 and 37 have highly polished surfaces and combine to project light from the lamp 34 through the opening 28 into the light chamber 29 and through the master film 12 onto the duplicating film 11 as they move through the exposure station 33. The lamp 34 may comprise any of the high intensity electric light sources typically employed in projection apparatus and film duplicating equipment.

A shutter 38 is disposed adjacent the side wall 27 and the opening 28 therein, and is movable from an open position where it is adjacent the side wall 27 as shown in FIG. 1 in solid line, to a closed position where it is in front of the opening 28 and is in front of the space between the reflecting elements 36 and 37, as shown in phantom line in FIG. 1. In the open position, light from the lamp 34 can strike the films 11 and 12 at the exposure station 33, but in the closed position, light which enters the light chamber 29 is essentially precluded from striking the films 11 and 12 at the exposure station 33. Movement of the shutter 38 is accomplished by a rack and pinion mechanism, the shutter 38 being attached to the lower end of the rack 40 which is meshed with and driven by a pinion gear 41 which is attached to the shaft 42 of a shutter drive motor 43. The shutter drive motor 43 is a reversible AC motor and a mechanism for controlling the direction of its operation is described subsequently.

A pressure roller 44 is disposed within the light chamber 29 and arranged to contact the surface of the master film 12 to press it against the duplicating film 11 just prior to the point where the films 11 and 12 are struck by light. This pressure substantially eliminates any air gaps between the two films 11 and 12 and ensures uniform contact therebetween which is essential to avoid undercutting of the image on the master film 12 during exposure of the duplicating film 11 thereunder to light. In the duplication of film images, and particularly microimages on microfilm, close contact during exposure to light is extremely important to avoid the loss of resolution which otherwise occurs due to non-radial light rays passing through the imaged film. Such diverging light rays, which unavoidably emanate from a light source unless optically redirected, tend to undercut the image on the master film 12 if the master film 12 and the duplicating film 11 are not in close contact with one another.

The pressure roller 44 is rotatably mounted on one end of a pivotably mounted support arm 45 which pivots about a pin 46 connected to the side plate 32. The other end of the support arm 45 is connected by a tension spring 47 to the back side of the lower reflecting element 31. From this arrangement, it can be seen that the pressure roller 44 is spring-biased into contact with the master film 12 when the shutter 38 is open. The pressure film 12 shutter 38 is moved to its closed position. This iS accomplished by the lower end of the shutter 38 striking the suPport arm 45 holding the pressure roller 44 and overcoming the force of the spring 47 by the force of the shutter drive motor 43 operating through the rack 40 and pinion gear 41 so that the pressure roller 44 is pivoted out of contact with the master film 12. This position of the support arm 45 and pressure roller 44 is shown in phantom in FIG. 1.

In the embodiment of the invention shown in FIG. 1 of the drawings, switches are disposed adjacent the paths of each of the films 11 and 12, and are adapted to be actuated upon depletion of either of the films 11 and 12. Thus, a first switch arm 50 is pivotably mounted on the back wall 51 of the equipment by a pin 52. A pressure roller 53 is rotatably secured to the opposite end of the switch arm 50 and rides upon the surface of the duplicating film 11 along a stretch thereof which moves toward the support cylinder 10. A second switch arm 54 is pivotably mounted on the back wall 51 of the equipment by a pin 55. A pressure roller 56 is rotatably secured to the opposite end of the switch arm 54 and rides upon the surface of the original master film 12 along a stretch thereof leaving the support cylinder 10.

Each of the switch arms 50 and 54 is mounted so that when the particular film 11 or 12, on which a respective pressure roller 53 or 56 rides, becomes depleted, the switch arm will drop or pivot about its respective pin 52 or 55 to assume a generally vertical position. The switch arms 50 and 54 are operably connected as by a control linkage (not shown) to electrical switches, shown in FIG. 2 and described subsequently, which are electrically connected in tandem or series with one another in accordance with the invention so as to control certain functions of the apparatus in a desired manner when one of the films 11 and 12 becomes depleted. In the particular type of apparatus shown, it is preferred that the switch arms 50 and 54 be located in the positions shown in FIG. 1 and described above. This ensures that depletion of the duplicating film 11 will be detected before the trailing end has contacted the support cylinder 10. This permits the leading end of a new reel of duplicating film 11 to be attached to the trailing end of the depleted reel so that continuity of operation and of duplication can be maintained without having to rewind the reel of master film 12. However, the depletion of the reel of master film 12 is preferably detected by the switch arm 54 after the trailing end of the master film 12 has left the support cylinder 10. This ensures that the information on the master film 12 will be completely duplicated before the apparatus is stopped.

Figure 2:
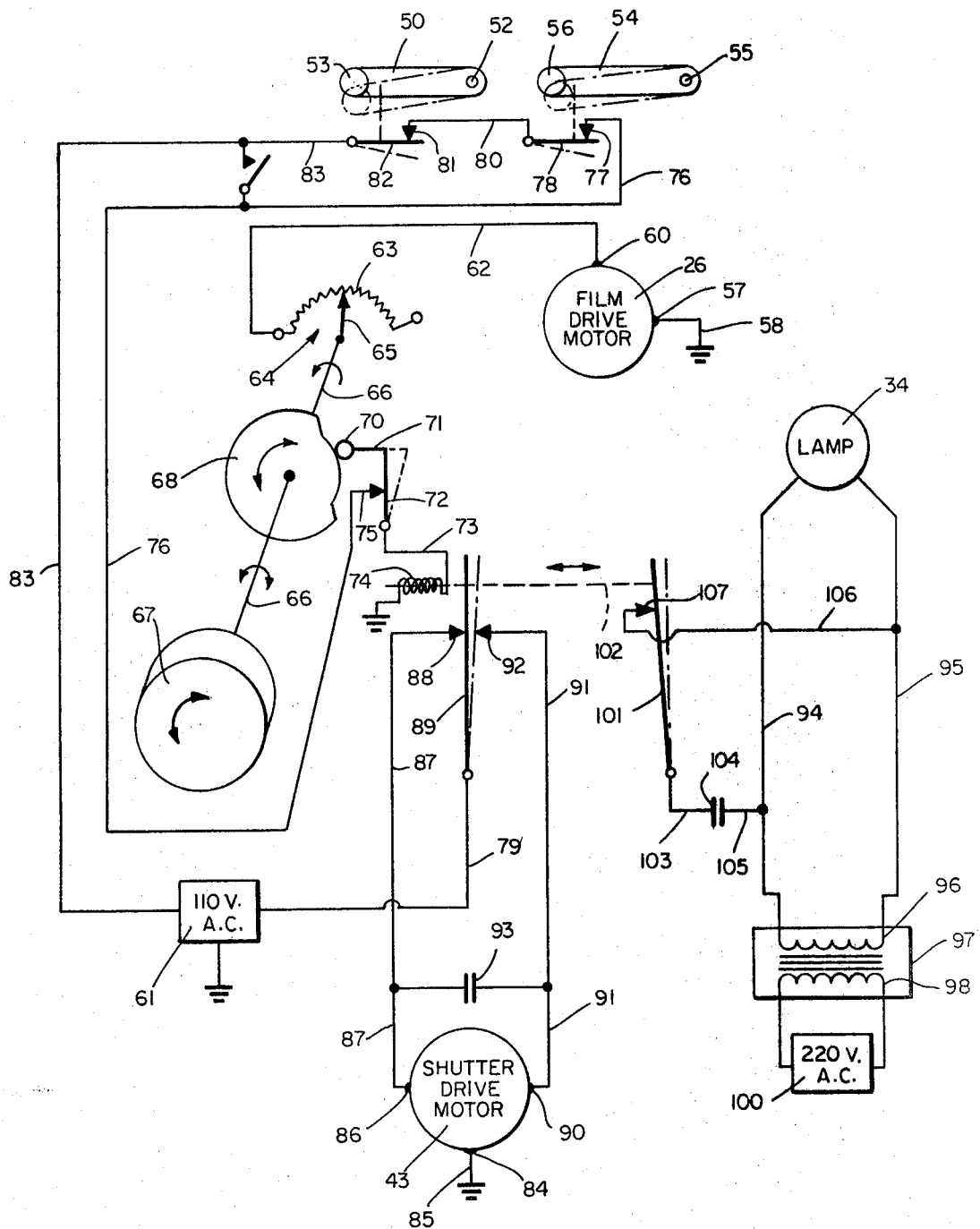
FIG. 2 is a schematic diagram of one form of the control system in the apparatus shown in FIG. 1 incorporating the detection system of the present invention.

FIG. 2 of the drawings schematically illustrates an electrical-mechanical system which incorporates the two switch arms 50 and 54, illustrated and described with reference to FIG. 1, in a manner using them to control the light source 34 and the shutter drive motor 43 in addition to the film drive motor 26. The film drive motor 26 which drives the guide roller 20 and the take-up reels for the films 11 and 12 has one terminal 57 electrically connected to ground by a conductor 58 and the other terminal 60 electrically connected to a power source 61 in the manner described subsequently.

The terminal 60 is initially connected by a conductor 62 to one end of a resistor 63 on a rheostat, indicated generally by reference numeral 64. A conductive pointer 65 on the rheostat 64 is connected to a rotatable conductive shaft 66, the opposite end of which is connected to a control knob 67. Thus, by turning the knob 67 about its rotational axis, the shaft 66 rotates and the position of the pointer 65 on the rheostat 64 is changed to place a different electrical resistance level between the pointer 65 and the film drive motor 26. This changes the speed of the drive motor 26. A conductive cam 68 is fixed to the rotatable shaft 66 so that it rotates with the shaft 66. A rotatably mounted conductive cam follower 70 contacts a portion of the cam 68 and is connected by a reciprocating conductive linkage element 71 to an upstanding conductive switch element 72 which pivots about its lower end. The switch element 72 is connected by a conductor 73 to an electrical power relay 74 which controls the operation of the shutter drive motor 43 and the light source 34 in a manner described subsequently.

A switch contact 75 is mounted in a position where it contacts the movable switch element 72 when the cam follower 70 is in the most radially inward or lowest portion of the periphery of the cam 68. However, when the cam 68 is rotated as by turning the knob 67, the cam follower 70 moves radially outwardly onto the higher portion of the periphery of the cam 68 thereby breaking contact between the movable switch element 72 and the switch contact 75. The switch contact 75 is connected by a conductor 76 to a switch contact 77. A movable switch element 78, operably connected to the switch arm 54, rotates about one end from a closed position where it contacts the switch contact 77 to an open position shown in phantom line in FIG. 2. Switch element 78 is connected to another switch contact 81. Another switch element 82 is operably connected to the switch arm 50 and is pivotally mounted at one end to move from a closed position where it contacts the switch contact 81 to an open position shown in phantom line in FIG. 2. The switch element 82 is connected by a conductor 83 to the power source 61.

From the above arrangement, it will be apparent that when both films 11 and 12 are present and running through the apparatus, both of the switches 82 and 78 will be closed so that electrical power furnished to conductor 83 will be fed to the film drive motor 26 through conductor 76, switch contact 75, switch element 72, cam follower 70, cam 68, shaft 66 and the rheostat 64. Therefore, upon rotation of the control knob 67, the cam 68 will move the cam follower 70 in a manner dependent upon the amount of power being supplied to the film drive motor 26, as determined by the position of the pointer 65 along the resistor 63 of the rheostat 64. However, upon depletion of either the duplicating film 11 being fed through the apparatus or the master film 12 being fed through the apparatus, the film drive motor 26 will be stopped as one of the switches 82 or 78 will be opened. Thus, when the duplicating film 11 is depleted, as evidenced by slack in the stretch contacted by the pressure roller 53, the switch arm 50 moves from the position shown in solid line to the position shown in phantom. This causes the conductive switch element 82 to move from its position shown in solid line to its position shown in dotted line, thereby breaking the electrical contact between the switch element 82 and a switch contact 81. Otherwise, electrical power is fed from the conductor 83 to the conductor 80 through the switch 82. When the master film 12 becomes depleted, as evidenced by slack in the stretch contacted by the pressure roller 56, the pressure roller 56 and switch arm 54 will move from the position shown in solid line to the position shown in phantom. When the switch arm 54 moves upon depletion of the master film 12, the switch element 78 moves from the position shown in solid line to the position shown in dotted line, thereby breaking contact between the switch element 78 and the switch contact 77.

It should be noted that the switch 82 which detects the depletion of the duplicating film 11 is arranged to stop the drive motor 26 before the trailing end of the duplicating film 11 enters the apparatus or contacts the support cylinder 10. This provides that the trailing end of the duplicating film 11 is exposed when stopped, and can be easily secured to the leading end of a new reel of film so that the feeding of a new reel of duplicating film can be easily commenced. However, the switch 78 detecting the depletion of the master film 12 is arranged to stop the film drive motor 26 after all of the master film 12 has passed through the exposure station 33 of the film duplication apparatus. In this instance, it is important that all of the master film be completely through the exposure station so that it is duplicated after which the reel 22 will be substituted for the supply reel 16 for making additional copies if desired.

The shutter drive motor 43 is a reversible electric motor, the electrical design characteristics of which permit it to be stalled without overheating for long periods of time. One terminal 84 thereof is electrically connected by conductor 85 to ground. Another terminal 86 thereof is electrically connected by a conductor 87 to a switch contact 88 which electrically engages the switch element 89 when the relay 74 is energized, as when the cam follower 70 is in the radially inward or low portion of the cam 68, indicating operation of the film drive motor 26 at a suitable speed to prevent burning of the films 11 and 12. In this mode of operation, the shutter drive motor 43 receives power from the electrical power source 61, and the shutter 38 is driven into its open position where light is permitted to pass from the light source or lamp 34 through the opening 28 and onto the films 11 and 12 at the exposure station 33.

The other terminal 90 of the shutter drive motor 43 is connected by a conductor 91 to a second switch contact 92 which electrically engages the switch element 89 when it is in the position shown in phantom line in FIG. 2. The switch element 89 is advanced to that position by a linkage element (schematically shown in dotted line) operated by the relay 74 when the pointer 65 of the rheostat 64 moves to or toward the end of the resistor 63 on the rheostat 64 such that the film drive motor 26 is operated at too slow a speed or is stopped. Thus, it is important that the drive motor 26 run sufficiently fast to prevent burning of the films 11 or 12, and if the speed falls off too far, the shutter 38 and the lamp 34 should be operated to prevent burning, as is described subsequently. Therefore, if the cam 68 has been rotated by the control knob 67 so that the cam follower 70 rests on its radially outermost or highest portion, the conductive linkage element 71 and the switch element 72 are forced to the right. This causes the switch element 89 to engage the switch contact 92 and to break electrical engagement with the switch contact 88. Power now flows from the electrical power source 61 through the conductor 79 through the switch element 89 to the switch contact 92 and through the conductor 91 to the shutter drive motor 43 to operate it in the opposite direction. The conductor 91 and the conductor 87 are connected by a capacitor 93 which effects the necessary change of polarity to reverse the direction of the shutter drive motor 43. In this mode of operation, the shutter 38 is moved to its closed position where it prevents light and heat from the light source or lamp 34 from striking the films 11 and 12 and burning them when they are not being advanced at all or sufficiently rapidly through the duplicating apparatus. However, it also occurs when one of the switch arms 50 or 54 drops, signalling depletion of one of the films 11 or 12.

The light source or lamp 34 is connected in series by conductors 94 and 95 to the high voltage coil 96 of a step-up transformer 97, the low voltage coil 98 of which is connected to an electrical power source 100 which supplies 220 volts A.C. In this manner, a relatively high voltage is supplied to the lamp 34 to operate it at full intensity so as to provide the required high illumination conditions for rapid film duplication. In accordance with the invention, however, a system is provided to decrease the voltage applied to the lamp 34 and accordingly, its intensity when the shutter drive motor 43 moves the shutter 38 to its closed position.

As shown in FIG. 2, an upstanding switch element 101 is pivotally supported at its lower end and is operably connected by a linkage element 102 shown in phantom line to the upstanding switch element 89 and to relay 74. The lower end of the switch element 101 is electrically connected by a conductor 103 to a capacitor 104, the other side of which is connected by a conductor 105 to the conductor 94. Another conductor 106 extends from the conductor 95 to a switch contact 107 which is engaged by the switch element 101 until it is moved by the linkage element 102 through the relay 74 and switch element 89 to the position shown in phantom. As pointed out previously, this movement occurs when the speed of the film drive motor 26 falls below a predetermined level or stops, as indicated by the position of the pointer 65 along the resistor 63 of the rheostat 64, which effects the power fed to the drive motor 26. This causes cam 68 to move and the cam follower 70 to be moved radially outwardly by the higher portion of the cam 68 thereby actuating relay 74, to advance linkage element 102, the switch element 89, and the switch element 101 to the right so that the switch element 101 electrically disengages the switch contact 107. The initial circuit places the capacitor 104 in parallel with the high voltage coil 96 of the step-up transformer 97 thereby increasing the voltage applied to the lamp 34. When the capacitor is removed from the circuit as by opening the switch 101, 107, the intensity of the light source or lamp 34 is diminished, thereby greatly extending its life for useful operation of the film duplication apparatus. This same effect results when either of switches 82 or 78 is opened as a result of films 11 or 12 being depleted.

In view of the above description of the invention and of the drawings, it can be seen that the invention provides means for detecting the depletion of films or tapes and for controlling a combination of elements in film or tape handling apparatus. In particular, the invention eliminates many of the problems of prior art film handling or processing apparatus and particularly problems experienced with film duplication apparatus employed in the past. Thus, by detection the depletion of one of several films, the apparatus of the invention automatically eliminates any risk of damage to the master film or the duplicating film at the exposure station when the apparatus is stopped or the films are fed through it too slowly. In addition, the apparatus incorporates a means for automatically controlling the position of a shutter which is important particularly in film duplication apparatus to prevent damage to the films by heat, or to prevent exposure of the duplicating film when the master film has become depleted. Furthermore, the apparatus provides a means for greatly extending the life of the projection lamp by reducing its intensity during periods where film duplication is not taking place and the shutter is closed, while one of the depleted films is replaced.

From the above description, it will be apparent that various modifications in the apparatus described in detail herein may be made without departing from the scope of the invention. For example, while a rheostat has been disclosed for controlling the speed of the film drive motor, some other more sophisticated electrical control apparatus might be employed to accomplish that purpose. In addition, the system might be made more automatic so that rather than using a control knob to control the speed of the film drive motor, the film drive motor might advantageously be made to be responsive to the light intensity striking the film as by monitoring and control equipment well known to those skilled in the art. Such equipment is clearly within the scope of this invention. It will be apparent, of course, that depending upon the type of film and the effect desired, the control apparatus could be made to operate the various switches either when the film drive motor stops completely or when the film drive motor is operated below a predetermined speed. This feat may be accomplished by proper design of the cam 68 shown in FIG. 2, as will be apparent to a person of ordinary engineering background, or by some other more elaborate system equally within the ability of such a person. Similarly, the respective mechanism for controlling the position of the pressure roller and the intensity of the projection lamp could be different from those shown without departing from the scope of the invention. It will also be readily apparent that the electrical circuits shown and described are merely exemplary of one type of circuit which may be used satisfactorily. Many other arrangements of the switches of the invention may be advantageously employed, depending upon the particular piece of apparatus involved. For example, each switch could be provided by a lamp directed toward the path of one of the tapes and a photoelectric cell positioned on the opposite side of the tape path from the lamp. Therefore, the invention is not to be limited to the specific details of the apparatus described herein except as may be required by the following claims.

What is claimed is:

1. In a machine for handling tapes, wherein first and second individual tapes are brought into overlying relationship with one another, jointly transported through an operational station, and separated, including tape transport means for moving each of said first and second individual tapes through said operational station, and an electrically controlled drive means operatively connected to said tape transport means, the improvement comprising
   first actuating means for detecting the depletion of said first tape, said actuating means being operatively connected to said drive means so as to stop said drive means when said first tape is depleted, and
   second actuating means for detecting the depletion of said second tape, said actuating means being operatively connected to said drive means so as to stop said drive means when said second tape is depleted.

2. The improvement in a machine for handling tapes, according to claim 1, wherein said first actuating means are disposed along the path of said first tape preceding said operational station, and said second actuating means are disposed along the path of said second tape following said operational station.

3. In apparatus for duplicating film, wherein an original master film and a duplicating film are brought into overlying relationship with one another, jointly transported through an illumination station, and separated, including an electrically controlled light source directed toward said illumination station, film transport means for moving each of said films through said illumination station, and an electrically controlled drive means operatively connected to said film transport means, the improvement comprising:
   switch means for reducing the intensity of said light source from a first intensity level which is adequate to perform film duplication to a second intensity level which is less than said first intensity level but not complete extinguishment of the light source;
   first actuating means for detecting the depletion of said duplicating film, said first actuating means being operatively connected to said drive means so as to stop said drive means when said duplicating film is depleted; and
   second actuating means for detecting the depletion of said original master film, said second actuating means being operatively connected to said drive means so as to stop said drive means when said original master film is depleted;
   said first and second actuating means being operatively connected to said switch means so as to reduce the intensity of said light source from said first intensity level to said second intensity level when one of said films is depleted and said drive means is stopped.

4. The improvement in apparatus for duplicating film, according to claim 3, including an electrically controlled shutter operatively disposed between said light source and said illumination station; and wherein said first and second actuating means are operatively connected to said shutter so as to close it when one of said films is depleted.

5. In apparatus for duplicating film, wherein an original master film and a duplicating film are brought into overlying relationship with one another, jointly transported through an illumination station, and separated, including an electrically controlled light source directed toward said illumination station, film transport means for moving each of said films through said illumination station, and an electrically controlled drive means operatively connected to said film transport means, the improvement comprising
   first actuating means for detecting the depletion of said duplicating film, said actuating means being operatively connected to said drive means so as to stop said drive means when said duplicating film is depleted, and
   second actuating means for detecting the depletion of said original master film, said actuating means being operatively connected to said drive means so as to stop said drive means when said original master film is depleted.

6. The improvement in apparatus for duplicating film, according to claim 5, wherein said first and second actuating means are operatively connected to said light source so as to reduce the intensity of said light source when one of said films is depleted.

7. The improvement in apparatus for duplicating film, according to claim 5, including an electrically controlled shutter operatively disposed between said light source and said illumination station, and wherein said first and second actuating means are operatively connected to said shutter so as to close it when one of said films is depleted.

8. The improvement in apparatus for duplicating film, according to claim 5, wherein said first actuating means are disposed along the path of said duplicate film preceding said illumination station, and said second actuating means are disposed along the path of said original master film following said operational station.

9. The machine for handling tapes according to claim 1, wherein at least one of said first and second actuating means comprises a lamp directed toward the path of one of said tapes and a photoelectric cell positioned on the opposite side of said tape path from said lamp.

* * * * *